(12) United States Patent
Takagi

(10) Patent No.: US 12,496,918 B2
(45) Date of Patent: Dec. 16, 2025

(54) CHARGING CONNECTOR

(71) Applicant: JAPAN AVIATION ELECTRONICS INDUSTRY, LIMITED, Tokyo (JP)

(72) Inventor: Youhei Takagi, Irvine, CA (US)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 340 days.

(21) Appl. No.: 18/132,049

(22) Filed: Apr. 7, 2023

(65) Prior Publication Data

US 2023/0398885 A1 Dec. 14, 2023

Related U.S. Application Data

(60) Provisional application No. 63/350,793, filed on Jun. 9, 2022.

(51) Int. Cl.
| | |
|---|---|
| *B60L 53/16* | (2019.01) |
| *H01R 13/502* | (2006.01) |
| *H01R 13/621* | (2006.01) |
| *H01R 13/627* | (2006.01) |

(52) U.S. Cl.
CPC ............ *B60L 53/16* (2019.02); *H01R 13/502* (2013.01); *H01R 13/621* (2013.01); *H01R 13/6271* (2013.01); *H01R 2201/26* (2013.01)

(58) Field of Classification Search
CPC ................ H01R 13/502; H01R 13/621; H01R 13/6271; H01R 2201/26; B60L 53/16
USPC ......................................................... 439/296
See application file for complete search history.

(56) References Cited

U.S. PATENT DOCUMENTS

| | | | | |
|---|---|---|---|---|
| 10,439,328 B2* | 10/2019 | Babezki | ................. | H01R 13/71 |
| 10,644,433 B2* | 5/2020 | Fuehrer | ................... | B60L 53/16 |
| 2015/0137755 A1* | 5/2015 | Sadano | ................... | B60L 53/16 |
| | | | | 320/109 |
| 2016/0072213 A1* | 3/2016 | Ichio | ....................... | B60L 53/16 |
| | | | | 439/34 |

(Continued)

FOREIGN PATENT DOCUMENTS

| | | | | |
|---|---|---|---|---|
| CN | 101740947 B | * | 8/2012 | .......... B60L 11/1818 |
| CN | 112542726 A | * | 3/2021 | .............. B60L 53/16 |
| DE | 102011004648 A1 | * | 8/2012 | .............. B60L 53/11 |

(Continued)

*Primary Examiner* — Peter G Leigh
(74) *Attorney, Agent, or Firm* — Holtz, Holtz & Volek PC

(57) ABSTRACT

In a charging connector, contacts are divided into a first terminal group and a second terminal group. The first terminal group is located upward of the second terminal group. A housing has a first surrounding portion which protrudes from a main surface thereof and surrounds the first terminal group. A mating portion has an attaching portion, a second surrounding portion and an upper protection portion. The attaching portion is attached on the main surface of the housing. The attaching portion is provided with an opening which penetrates therethrough in the front-rear direction. The first surrounding portion of the housing extends forward through the opening. The second surrounding portion is located downward of the opening. The second surrounding portion protrudes forward from the attaching portion and surrounds the second terminal group. The upper protection portion is located upward of the opening and protrudes forward from the attaching portion.

7 Claims, 9 Drawing Sheets

(56) References Cited

U.S. PATENT DOCUMENTS

2018/0269619 A1    9/2018   Beimdieck et al.
2022/0102904 A1*   3/2022   Feldner ................ H01R 13/506

FOREIGN PATENT DOCUMENTS

| DE | 102015100452 A1 * | 7/2016 | ......... H01R 13/6315 |
| DE | 102016105371 A1 * | 9/2017 | ............. B60L 53/16 |
| JP | 2018163876 A | 10/2018 | |
| LU | 93238 B1 * | 4/2018 | ............. B60L 53/16 |
| WO | WO-2018060153 A1 * | 4/2018 | ............. B60L 53/16 |

* cited by examiner

CHARGING CONNECTOR

BACKGROUND ART

This invention relates to a charging connector, particularly to a structure of the charging connector.

Patent Document 1 discloses an example of a charging connector.

As shown in FIG. 15, a charging connector 90 of Patent Document 1 has a housing body 92, a housing portion 94 and an attachment portion (a fitting portion) 96. The housing portion 94 has plug-in elements 941 and 943. The plug-in elements 941 and 943 correspond to contacts (not shown), respectively. The housing portion 94 is connected to the housing body 92. On the other hand, the attachment portion 96 has plug-in portions 961 and 963. The attachment portion 96 is attached to the housing body 92.

As shown in FIG. 15, the plug-in portion 961 of the attachment portion 96 surrounds the plug-in element 941 of the housing portion 94. The plug-in portion 963 of the attachment portion 96 surrounds the plug-in element 943 of the housing portion 94. When the charging connector 90 accidentally falls, the plug-in portions 961 and 963 of the attachment portion 96 prevent the plug-in elements 941 and 943 of the housing portion 94 from directly hitting against a floor or the ground. The attachment portion 96 is attached to the housing body 92 by using a fastening part 98, so that it can be easily replaced even if it is broken by falling.

Patent Document 1: Patent Document 1: U.S. Pat. No. 10,644,433 B2

DISCLOSURE OF INVENTION

When the charging connector 90 of Patent Document 1 is in conformity to the standard of Combined Charging System Type-1 (CCS1), an arrangement of the plug-in elements 941 and 943 (or contacts) must be decided by using the plug-in portions 961 and 963 as a reference. However, in the charging connector 90 of Patent Document 1, the housing portion 94 and the attachment portion 96 are distinct and separated from each other. Accordingly, the charging connector 90 of Patent Document 1 can have a problem of arrangement accuracy of the plug-in elements 941 and 943 (or the contacts) with respect to the plug-in portion 961.

It is therefore an object of this invention to provide a charging connector with a structure which can ensure arrangement accuracy of terminal groups and allows a part easily broken by falling to be easily replaceable.

In detail, in a charging connector of an aspect of this invention, a part corresponding to the plug-in portion 961 of the charging connector 90 is provided to a part corresponding to the housing portion 94, and a protection portion which receives a shock of the falling instead of the plug-in portion 961 is provided to the attachment portion 96.

In more detail, a charging connector according to one aspect of the present invention is provided with a mating portion, a main portion and a body. The main portion comprises a plurality of contacts, which are respectively connectable to mating contacts of a mating connector, and a housing, which holds the contacts. The contacts are divided into a first terminal group and a second terminal group. The first terminal group is located upward of the second terminal group in an up-down direction. The housing has a main surface, which is oriented forward in a front-rear direction perpendicular to the up-down direction, and a first surrounding portion, which protrudes forward from the main surface in the front-rear direction and surrounds the first terminal group in a plane perpendicular to the front-rear direction. The body accommodates the main portion at least in part and holds the main portion. The mating portion is located forward of the body in the front-rear direction. The mating portion has an attaching portion, a second surrounding portion and an upper protection portion. The attaching portion is attached on the main surface of the housing. The attaching portion extends in a plane perpendicular to the front-rear direction. The attaching portion is provided with an opening which penetrates therethrough in the front-rear direction. The first surrounding portion of the housing extends forward through the opening. The second surrounding portion is located downward of the opening in the up-down direction. The second surrounding portion protrudes forward from the attaching portion in the front-rear direction and surrounds the second terminal group in a plane perpendicular to the front-rear direction. The upper protection portion is located upward of the opening in the up-down direction and protrudes forward from the attaching portion in the front-rear direction.

A mating portion according to another aspect of the present invention is a mating portion of a charging connector. The charging connector comprises a main portion. The main portion has a main surface, which is oriented forward in a front-rear direction, and a first surrounding portion, which protrudes forward from the main surface. The mating portion has an attaching portion, a second surrounding portion and an upper protection portion. The attaching portion is to be attached on the main surface of the main portion. The attaching portion extends in a plane perpendicular to the front-rear direction. The attaching portion is provided with an opening which penetrates therethrough in the front-rear direction. When the attaching portion is attached on the main surface of the main portion, the first surrounding portion of the main portion extends forward through the opening. The second surrounding portion is located downward of the opening in an up-down direction perpendicular to the front-rear direction. The second surrounding portion protrudes forward from the attaching portion in the front-rear direction. The upper protection portion is located upward of the opening in the up-down direction and protrudes forward from the attaching portion in the front-rear direction.

A mating portion according to yet another aspect of the present invention is a mating portion of a charging connector. The charging connector comprises a main portion and a body. The main portion comprises a plurality of contacts, which are respectively connectable to mating contacts of a mating connector, and a housing, which holds the contacts. The contacts are divided into a first terminal group and a second terminal group. The first terminal group is located upward of the second terminal group in an up-down direction. The housing has a main surface, which is oriented forward in a front-rear direction perpendicular to the up-down direction, and a first surrounding portion, which protrudes forward from the main surface in the front-rear direction and surrounds the first terminal group in a plane perpendicular to the front-rear direction. The body accommodates the main portion at least in part and holds the main portion. The mating portion is located forward of the body in the front-rear direction. The mating portion has an attaching portion, a second surrounding portion and an upper protection portion. The attaching portion is to be attached on the main surface of the housing. The attaching portion extends in a plane perpendicular to the front-rear direction. The attaching portion is provided with an opening which penetrates therethrough in the front-rear direction. When the attaching portion is attached on the main surface of the housing, the first surrounding portion of the housing extends forward through the opening. The second surrounding portion is located downward of the opening in the up-down direction. The second surrounding portion protrudes forward from the attaching portion in the front-rear direction and surrounds the second terminal group in a plane perpendicular to the front-rear direction when the attaching portion is attached on the main surface of the housing. The upper protection portion is located upward of the opening in the up-down direction and protrudes forward from the attaching portion in the front-rear direction.

In the charging connector according to the aspect of the present invention, the housing has the first surrounding portion which surrounds the first terminal group. The first surrounding portion extends forward through the opening provided in the mating portion. The mating portion has the second surrounding portion, which surrounds the second terminal group, and the upper protection portion. In the up-down direction, the second surrounding portion is located downward of the opening in the up-down direction while the upper protection portion is located upward of the opening.

In the aforementioned structure, the first surrounding portion is a part of the housing, so that it does not cause a problem regarding arrangement accuracy of the first terminal group and the second terminal group even when it is used as a reference for arrangement of the first terminal group and the second terminal group. Moreover, the upper protection portion and the second surrounding portion are located upward and downward of the first surrounding portion in the up-down direction, respectively, so that possibility of damage to the first surrounding portion caused by falling of the charging connector can be minimized. In addition, the upper protection portion and the second surrounding portion are parts of the mating portion, so that repairing for damage to them caused by falling of the charging connector can be finished by replacing the mating portion with another one.

The mating portion of the charging connector according to another aspect of the present invention makes it possible to use the first surrounding portion of the housing as a reference for arrangement of the first terminal group and the second terminal group and to secure positional accuracy of the terminal groups. The same is true for the mating portion of the charging connector according to yet another aspect of the present invention.

An appreciation of the objectives of the present invention and a more complete understanding of its structure may be had by studying the following description of the preferred embodiment and by referring to the accompanying drawings.

Figure 1:
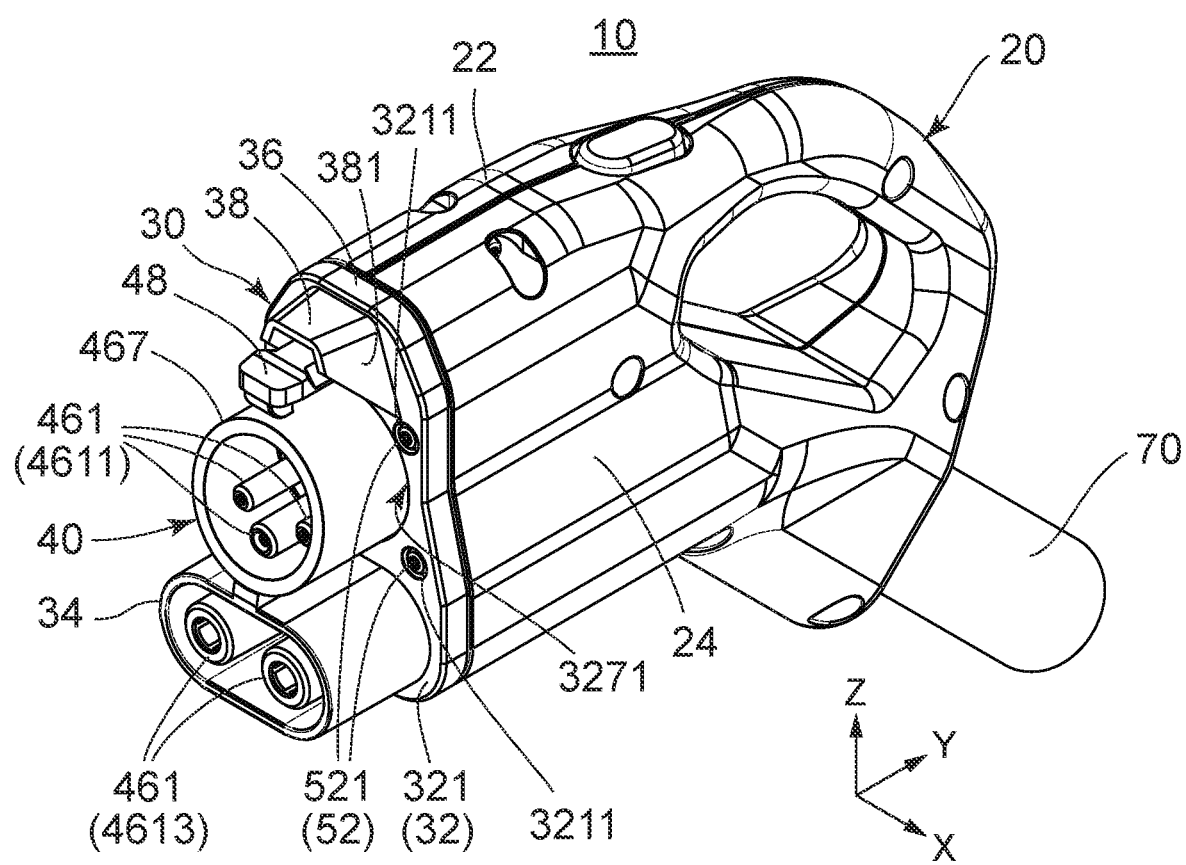
FIG. 1 is a perspective view showing a charging connector according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
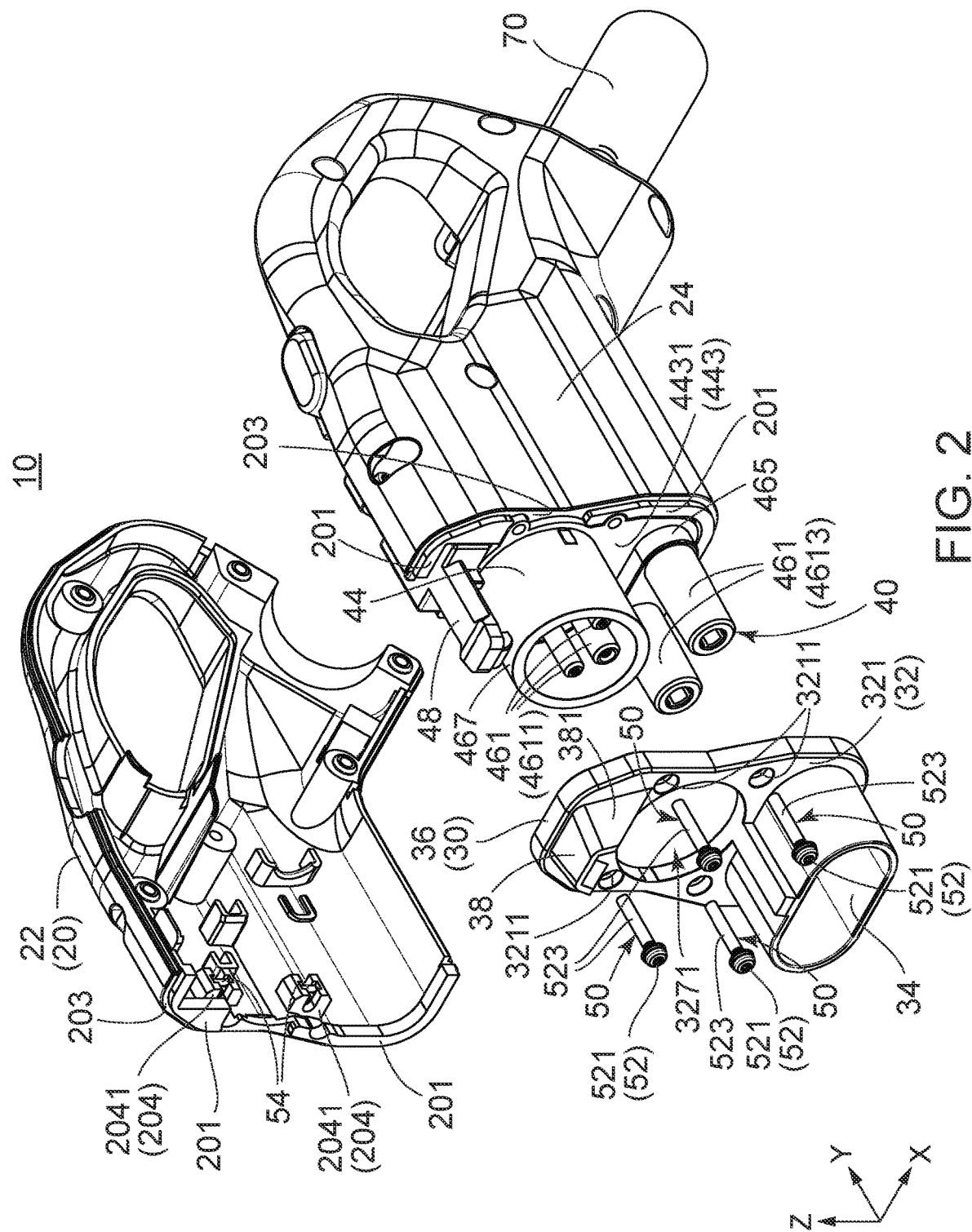
FIG. 2 is an exploded, perspective view showing the charging connector of FIG. 1. A main portion of the charging connector is held by a first body portion included in a body.

Referring to FIGS. 1 and 2, a charging connector 10 according to an embodiment of the present invention is provided with a body 20, a mating portion 30 and a main portion 40. The charging connector 10 is connected to an end of a cable 70. The charging connector 10 is mateable with and detachable from a mating connector (not shown) in a front-rear direction. In the present embodiment, the front-rear direction is a Y-direction. A negative Y-direction is directed forward while a positive Y-direction is directed rearward.

As shown in FIG. 2, the body 20 has a first body portion 22 and a second body portion 24 which are separatable from each other in a lateral direction perpendicular to the front-rear direction. In the present embodiment, the lateral direction is an X-direction. As understood from FIGS. 2 and 4, the first body portion 22 and the second body portion 24 are fixed to each other by using a plurality of screws 26.

As understood from FIG. 2, a front-end portion of the body 20 is provided with a plurality of elongated protrusion portions 201. The elongated protrusion portions 201 protrude forward from a front surface 203 of the body 20 in the front-rear direction. Moreover, the elongated protrusion portions 201 are located inward of an outer edge of the front surface 203 of the body 20 in a plane perpendicular to the front-rear direction.

As understood from FIG. 2, the body 20 accommodates the main portion 40 at least in part and holds the main portion 40. In the present embodiment, the body 20 accommodates the main portion 40 in part. In the present embodiment, the main portion 40 is all components of the charging connector 10 except for the body 20 and the mating portion 30.

As shown in FIGS. 1 to 4, the mating portion 30 is located forward of the body in the front-rear direction. In detail, the mating portion 30 is attached to the front-end portion of the body 20. In a state that the mating portion 30 is attached to the body 20, the mating portion 30 covers the main portion 40 in part from a front of the main portion 40.

As shown in FIG. 2, the mating portion 30 is fixed to the body 20 by using fastening members 50. In other words, the charging connector 10 is further provided with the fastening members 50 which couple the mating portion 30 to the body 20. The fastening members 50 couple the mating portion 30 to the body 20. In the present embodiment, the fastening members 50 are four in number. However, the present invention is not limited thereto. The number of the fastening member 50 should be one at least.

As understood from FIG. 2, in the present embodiment, each of the fastening members 50 is provided with a screw 52 and a nut 54. The screw 52 has a head portion 521 and a shank portion 523. In the present embodiment, the screw 52 is a pan head screw. The nut 54 is a square nut having a square shape when viewed along the front-rear direction. However, the present invention is not limited thereto. The screw 52 may be a screw 52 having a head portion 521 with a shape different from that of a pan head, for example, may be a mushroom head screw. Moreover, the nut 54 may be a nut 54 having a shape other than the square, for example, may be a rectangular nut. Nevertheless, it is preferable that the nut 54 is not a ring nut and a hexagon nut in terms of preventing rotation.

As shown in FIG. 2, the body 20 has a plurality of nut holding portions (holding portions) 204 which hold the nuts 54, respectively. The nut holding portions 204 are equal to the fastening members 50 in number. In the present embodiment, the number of the nut holding portions 204 is four. Each of the nut holding portions 204 has a nut accommodation portion which opens inward in the lateral direction. The nut 54 is inserted or press-fit into the nut accommodation portion and accommodated in the nut accommodation portion. Thus, the nut 54 is held by the nut holding portion 204 or the body 20. Regarding the nut 54 held by the nut holding portion 204, front-rear movement, outward movement in the lateral direction and rotational movement about an axis along the front-rear direction are regulated.

Figure 3:
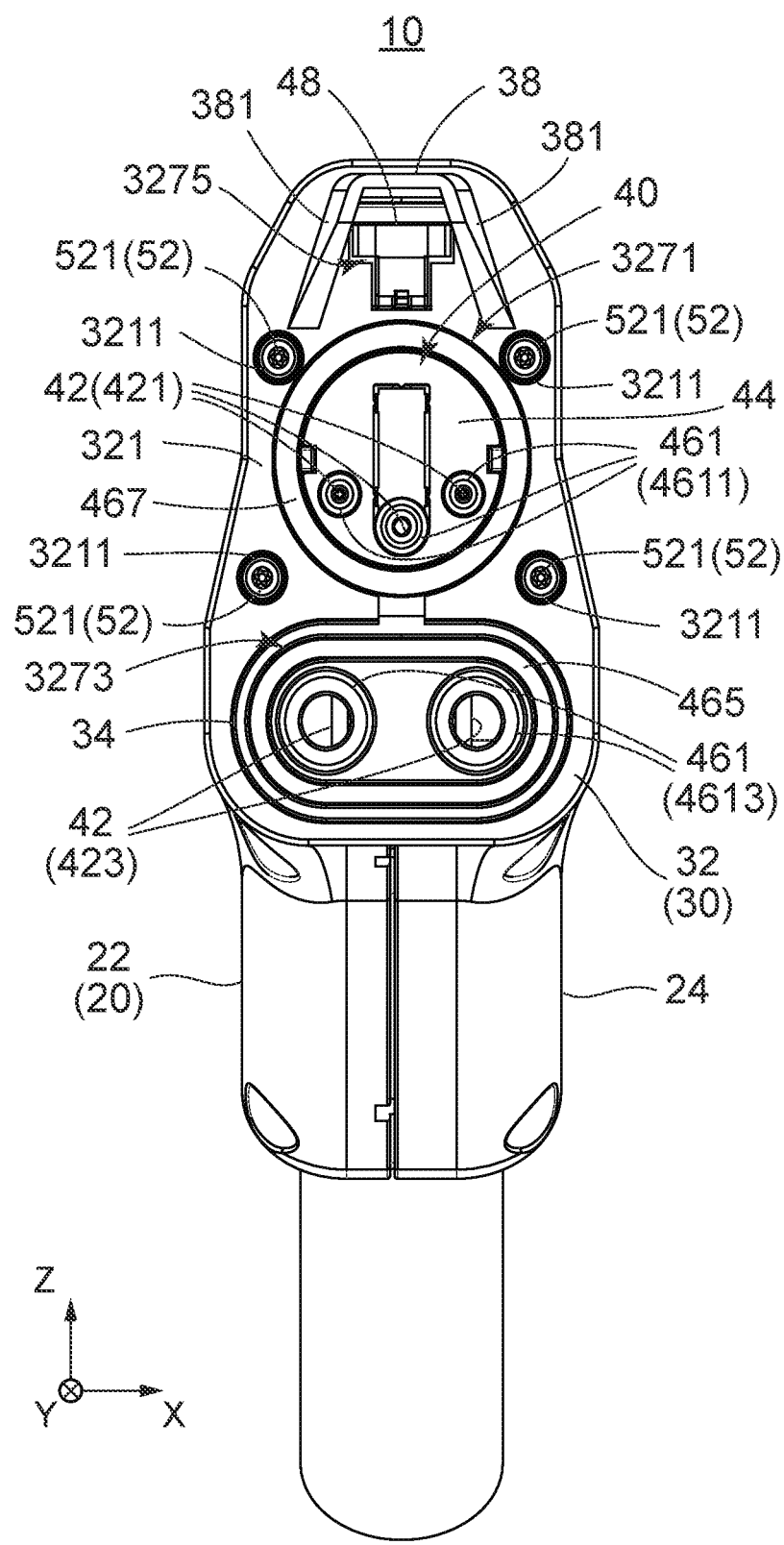
FIG. 3 is a front view showing the charging connector of FIG. 1.

As understood from FIGS. 2 and 3, the main portion 40 is provided with a plurality of contacts 42 and a housing 44 which holds the contacts 42. Each of the contacts 42 is connected to at least one of end portions of electric wires (not shown) included in the cable 70. The contacts 42 correspond to mating contacts (not shown) provided in a mating connector (not shown), respectively. When the charging connector 10 and the mating connector are mated with each other, the contacts 42 are brought into contact with and electrically connected to the mating contacts, respectively.

As understood from FIG. 3, the contacts 42 are divided into a first terminal group 421 and a second terminal group 423 on the basis of intended use of them. Each of the contacts 42 has a shape and a size according to the intended use thereof. Herein, the description about the shape and the size of the contact 42 will be omitted. In the present embodiment, the number of the contacts 42 belonging to the first terminal group 421 is three. The number of the contacts 42 belonging to the second terminal group 423 is two. The first terminal group 421 is located upward of the second terminal group 423 in an up-down direction perpendicular to both the front-rear direction and the lateral direction. In the present embodiment, the up-down direction is a Z-direction.

Figure 5:
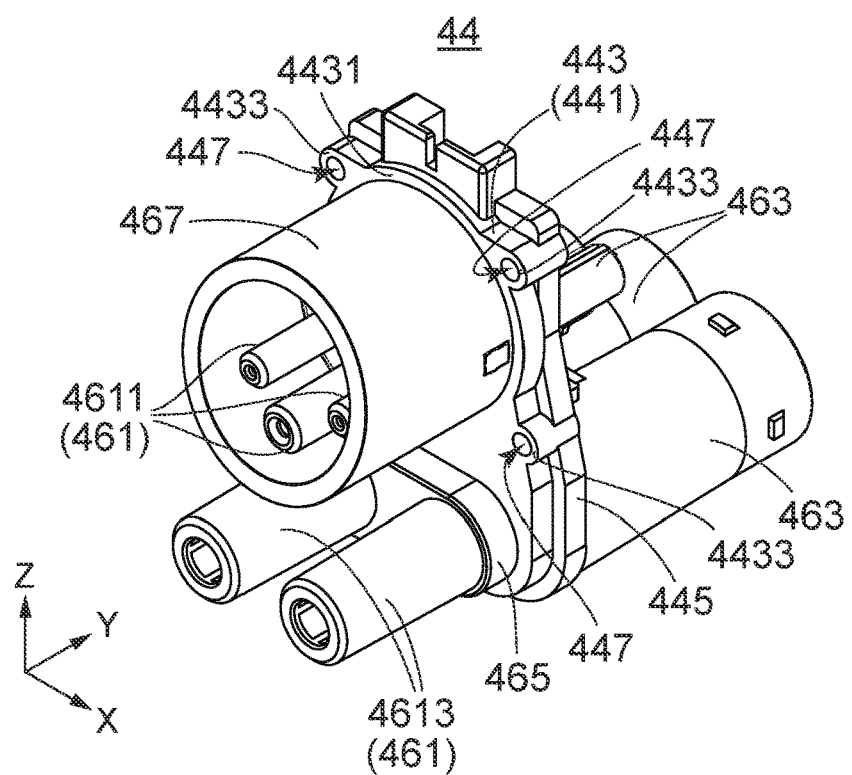
FIG. 5 is a front, perspective view showing a housing included in the main portion of the charging connector of FIG. 1.
Figure 6:
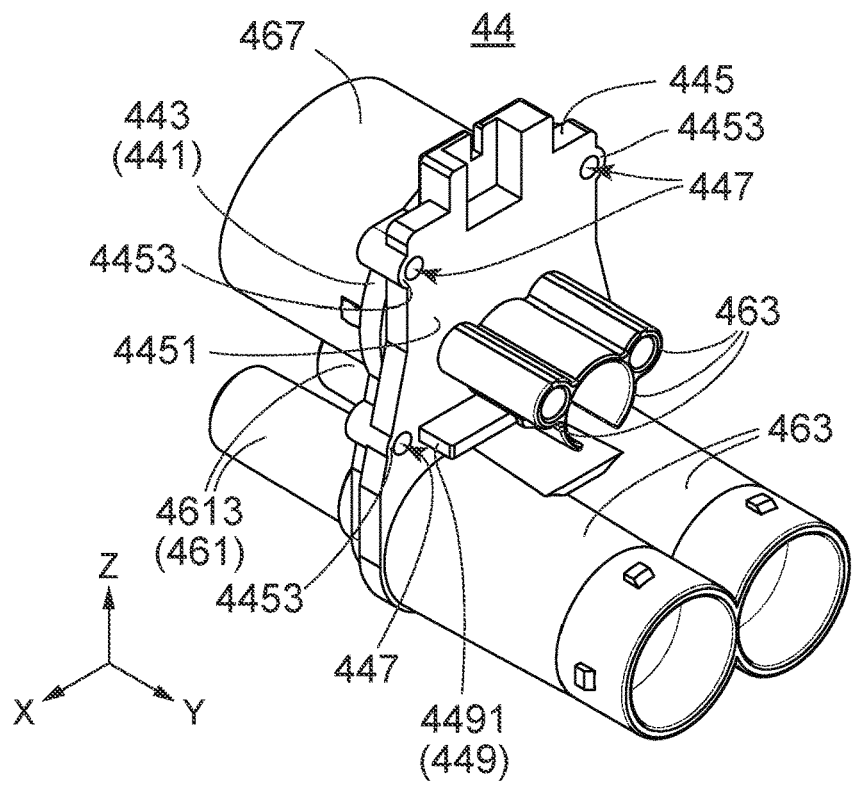
FIG. 6 is a rear, perspective view showing the housing of FIG. 5.

As shown in FIGS. 5 and 6, the housing 44 has a partition wall 441 with a main surface (a front surface) 4431, a plurality of covering portions 461, a plurality of accommodation portions 463 and a first surrounding portion 467. The partition wall 441 has a front portion 443 and a rear portion 445 which are integrally formed. In the front-rear direction, the front portion 443 is located forward of the rear portion 445. Moreover, in the front-rear direction, the main surface 4431 is oriented forward while a rear surface 4451 of the rear portion 445 is oriented rearward. In a plane perpendicular to the front-rear direction, the rear portion 445 protrudes outward of the front portion 443 except for parts thereof.

As understood from FIG. 3, the covering portions 461 correspond to the contacts 42, respectively. As understood from FIG. 7, the covering portions 461 are divided into a first covering portion group 4611 and a second covering portion group 4613 which correspond to the first terminal group 421 and the second terminal group 423, respectively. Moreover, as understood from FIGS. 7 and 8, the covering portions 461 correspond to the accommodation portions 463, respectively. As understood from FIGS. 5 and 9, the covering portions 461 protrude forward from the main surface 4431 of the partition wall 441 in the front-rear direction.

As understood from FIG. 3, in a plane perpendicular to the front-rear direction, the contacts 42 are covered by the covering portions 461. In addition, as understood from FIG. 1, in the front-rear direction, tips of the contacts 42 are covered by the covering portions 461.

Figure 7:
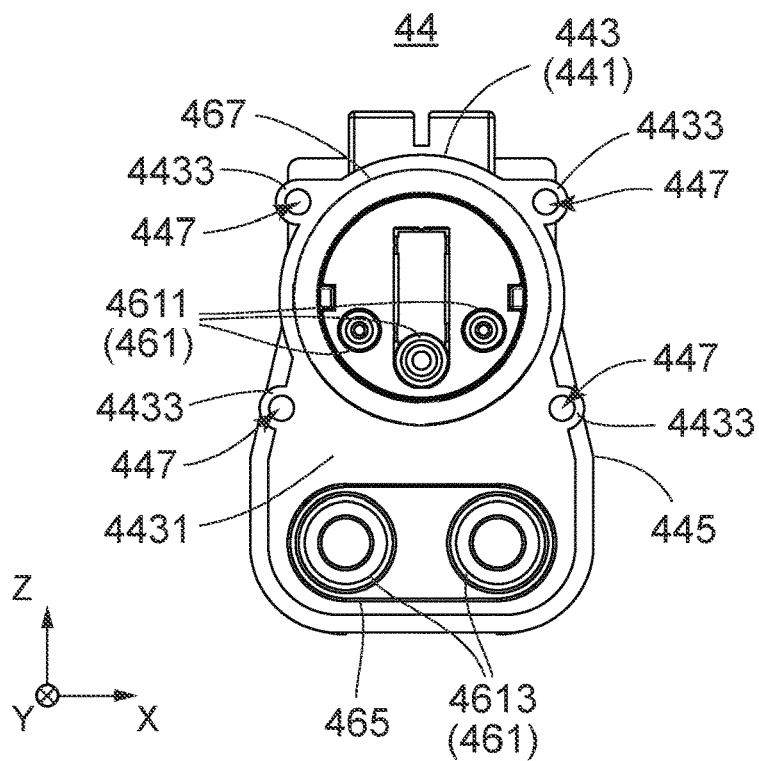
FIG. 7 is a front view showing the housing of FIG. 5.
Figure 9:
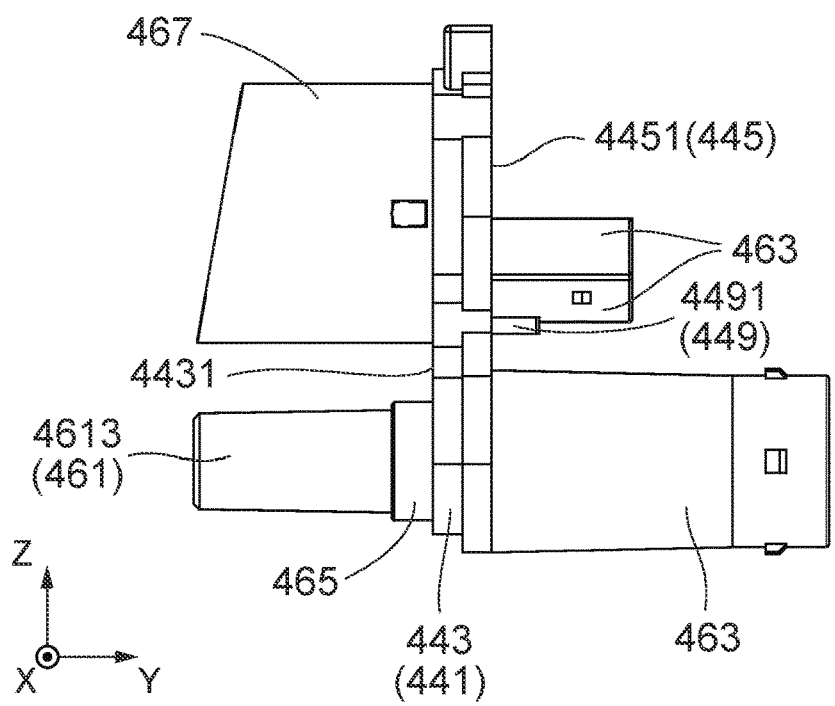
FIG. 9 is a side view showing the housing of FIG. 5.

As shown in FIG. 9, the first surrounding portion 467 protrudes forward from the main surface 4431 in the front-rear direction. Moreover, as shown in FIG. 7, the first surrounding portion 467 surrounds the first covering portion group 4611 in a plane perpendicular to the front-rear direction. In other words, the first surrounding portion 467 surrounds the first terminal group 421 in the plane perpendicular to the front-rear direction. In the present embodiment, the first surrounding portion 467 has a cylindrical shape. In other words, the first surrounding portion 467 has a circular shape in the plane perpendicular to the front-rear direction. The first surrounding portion 467 has the circular shape, so that it is easy to use as a reference for arrangement of the covering portions 461, and it is helpful to improve arrangement accuracy of the covering portions 461.

As shown in FIGS. 5 and 7, in the present embodiment, the housing 44 is provided with a base portion 465. The base portion 465 is shared among the covering portions 461 of the second covering portion group 4613. As shown in FIG. 9, the base portion 465 protrudes forward from the main surface 4431. As understood from FIG. 7, the base portion 465 has a specified shape other than the circular shape when viewed along the front-rear direction. In the present embodiment, the specified shape is a racetrack shape. However, the present invention is not limited thereto. As the specified shape of the base portion 465, any shape other than the circular shape may be employed.

Figure 8:
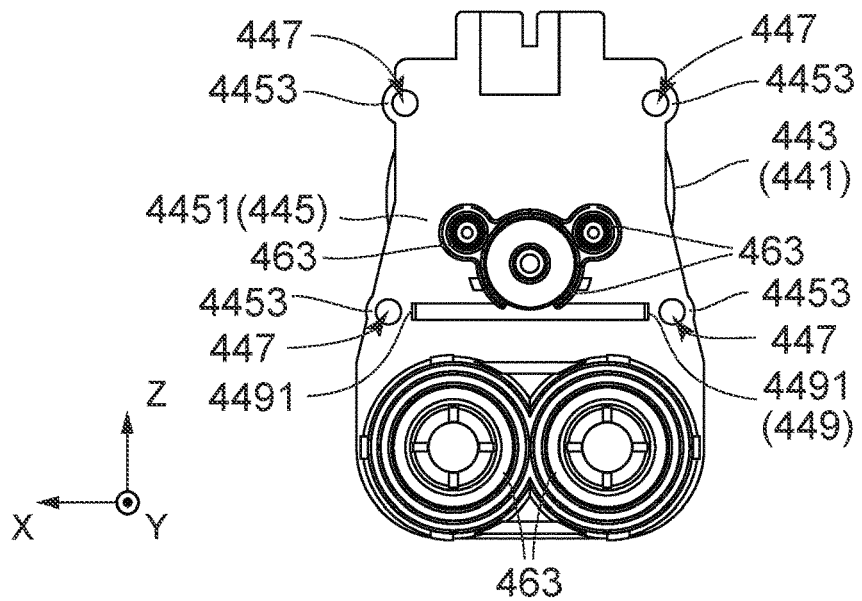
FIG. 8 is a rear view showing the housing of FIG. 5.

As shown in FIG. 9, the accommodation portions 463 protrude rearward from the rear surface 4451 of the partition wall 441. In the front-rear direction, an interior space of each of the covering portions 461 and an interior space of the accommodation portion 463 corresponding to the covering portions 461 communicate with each other. As shown in FIG. 8, in the present embodiment, each of the accommodation portions 463 is coupled to one or more of the other accommodation portions 463. However, the present invention is not limited thereto. The accommodation portions 463 may be independent of one another.

As shown in FIGS. 7 and 8, the partition wall 441 is formed with a plurality of holes 447 piercing therethrough in the front-rear direction. The holes 447 correspond to the fastening members 50, respectively. The holes 447 are located near an edge portion of the partition wall 441. An internal diameter of each of the holes 447 is larger than an external diameter of the shank 523 of the screw 52 of the fastening member (see FIG. 2). Moreover, the internal diameter of the hole 447 is equal to or larger than an internal diameter of an opening 325, which will be described later, of the mating portion 30.

As understood from FIGS. 6 and 8, the rear surface 4451 of the partition wall 441 is further provided with a falling prevention portion 449 protruding rearward. The falling prevention portion 449 is a plate-like portion extending in the lateral direction. The falling prevention portion 449 has side surfaces 4491 oriented outward in the lateral direction. Each of the side surfaces 4491 corresponds to any one of the holes 447. When viewed along the front-rear direction, each of the side surfaces 4491 is oriented to the hole 447 corresponding thereto.

Figure 10:
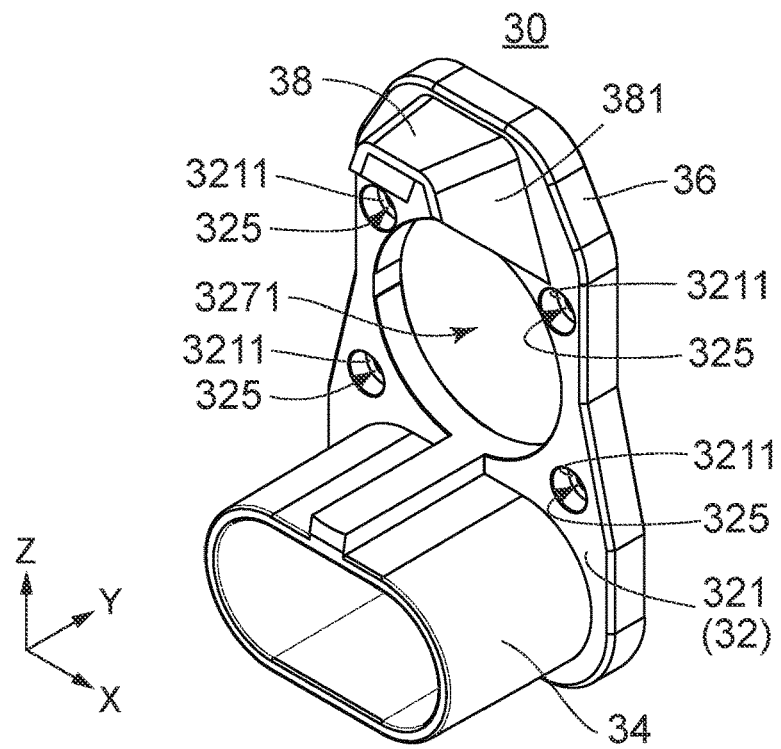
FIG. 10 is a front, perspective view showing a mating portion included in the charging connector of FIG. 1.
Figure 11:
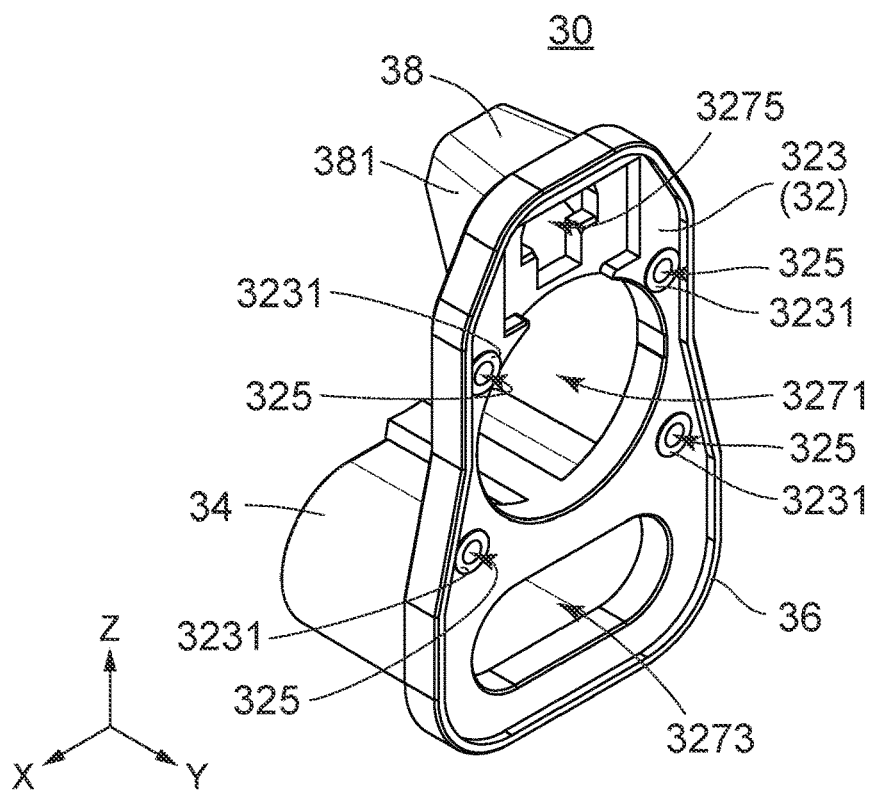
FIG. 11 is a rear, perspective view showing the mating portion of FIG. 10.

As shown in FIGS. 2, 10 and 11, the mating portion 30 has an attaching portion 32, a second surrounding portion 34, an edge portion 36, an upper protection portion 38, a plurality of first abutment portions 3231 and a plurality of receiving portions 3211.

Figure 12:
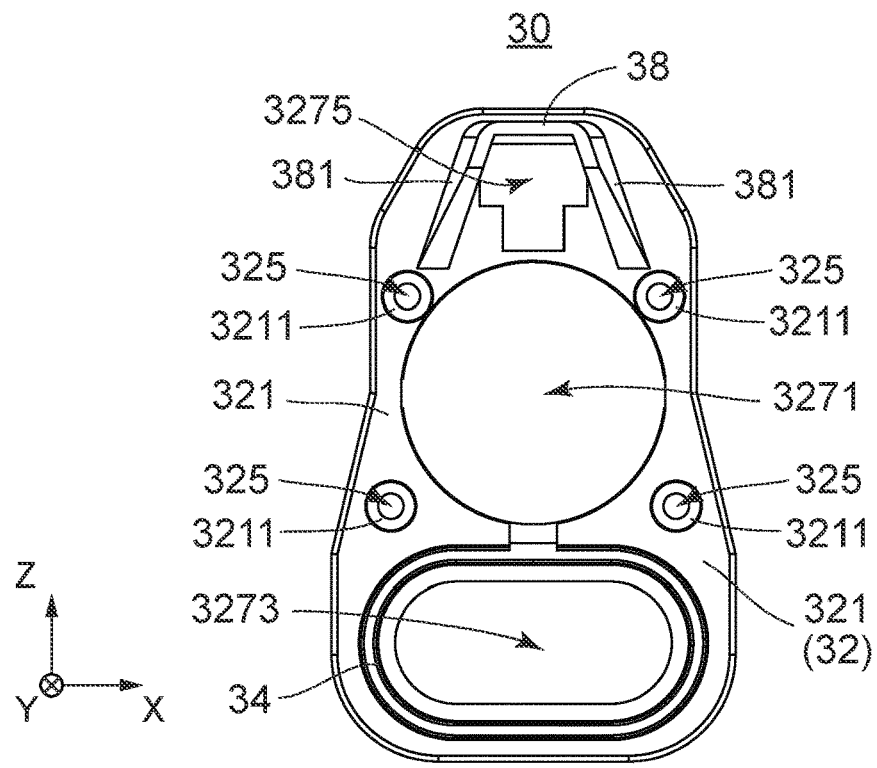
FIG. 12 is a front view showing the mating portion of FIG. 10.
Figure 13:
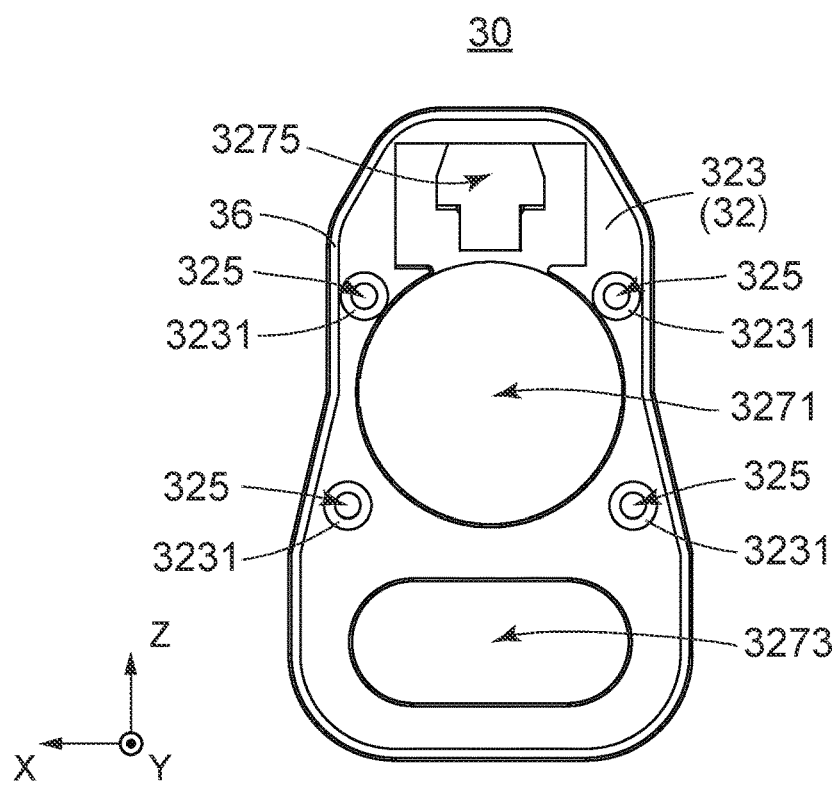
FIG. 13 is a rear view showing the mating portion of FIG. 10.
Figure 14:
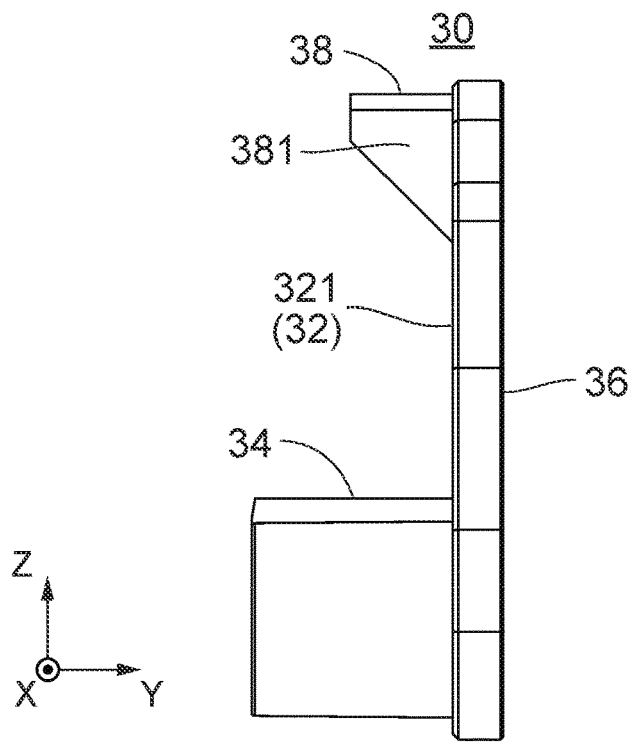
FIG. 14 is a side view showing the fitting portion of FIG. 10.
Figure 15:
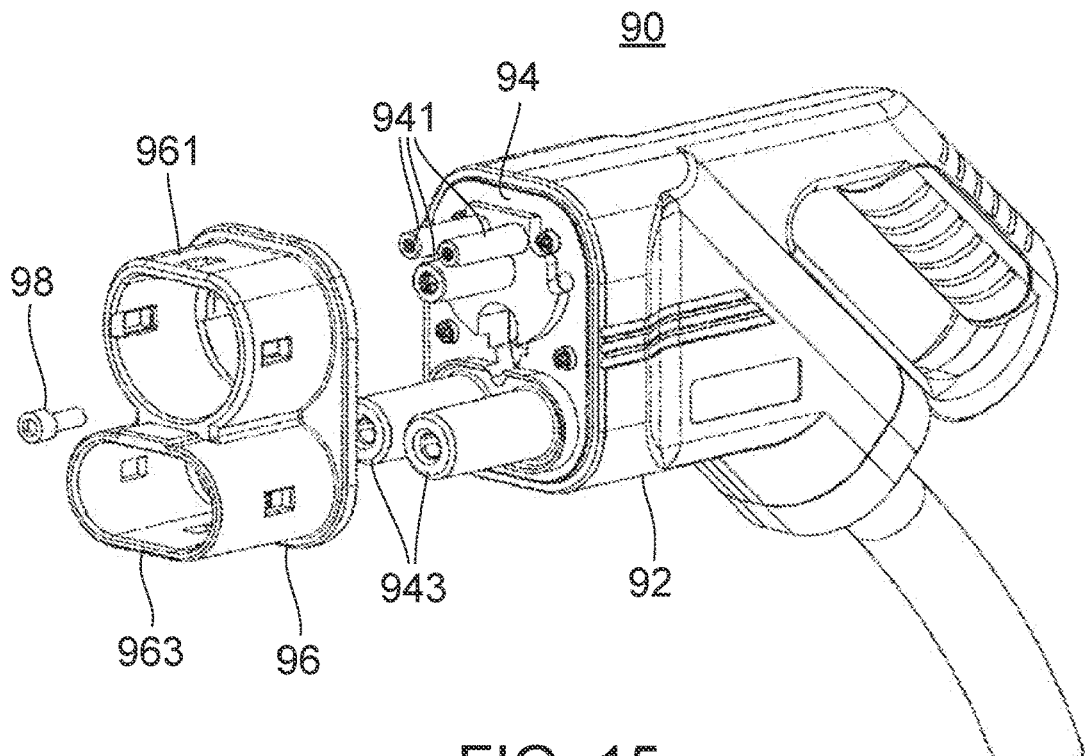
FIG. 15 is an exploded, perspective view showing a charging connector disclosed in Patent Document 1.

As understood from FIGS. 12 to 14, the attaching portion 32 extends in a plane perpendicular to the front-rear direction. The attaching portion 32 has a front surface 321 oriented forward in the front-rear direction and a rear surface (facing surface) 323 oriented rearward in the front-rear direction.

As shown in FIGS. 12 and 13, the attaching portion 32 is provided with a first opening (opening) 3271, a second opening 3273 and a third opening 3275 which pierce the attaching portion 32 in the front-rear direction. The first opening (opening) 3271, the second opening 3273 and the third opening 3275 are arranged in a line in the up-down direction. The first opening 3271 is located between the second opening 3273 and the third opening 3275 in the up-down direction. The second opening 3273 is located downward of the first opening 3271 in the up-down direction. The third opening 3275 is located upward of the first opening 3271 in the up-down direction.

Referring to FIG. 2 in addition to FIGS. 12 and 13, the first opening 3271 corresponds to the first surrounding portion 467 of the housing 44. The second opening 3273 corresponds to the base portion 465 of the housing 44. The third opening 3275 corresponds to a latch portion 48 of the main portion 40.

As shown in FIGS. 10 and 12, in the present embodiment, the first opening 3271 has a circular shape when viewed along the front-rear direction. The second opening 3273 has a racetrack shape. The third opening 3275 has a roughly T-shape.

As shown in FIGS. 10 and 12, the second surrounding portion 34 is located downward of the first opening 3271 in the up-down direction and protrudes forward from the attaching portion 32 in the front-rear direction. In detail, the second surrounding portion 34 corresponds to the second opening 3273 and is a cylindrical portion protruding forward from an edge of the second opening 3273.

As understood from FIGS. 7 and 12, the second opening 3273 and the second surrounding portion 34 have shapes corresponding to the base portion 465 of the housing 44 (see FIG. 7). As described above, in the present embodiment, the second opening 3273 has the racetrack shape when viewed along the front-rear direction. A shape of the second surrounding portion 34 is similar to the shape of the second opening 3273 when viewed along the front-rear direction and has a racetrack shape. The second opening 3273 and the second surrounding portion 34 can receive the base portion 465 at least in part.

As shown in FIGS. 10 and 12, the upper protection portion 38 has a plate-like shape perpendicular to the up-down direction. The upper protection portion 38 is located upward of the first opening 3271 in the up-down direction. The upper protection portion 38 is supported by a pair of supporting portions 381 intersecting with the up-down direction. The supporting portions 381 are located outward of the first opening 3271 in the lateral direction. The upper protection portion 38 and the supporting portions 381 protrude forward from the attaching portion 32 in the front-rear direction.

As shown in FIGS. 12 and 13, the attaching portion 32 is further formed with a plurality of holes 325 piercing the attaching portion 32 in the front-rear direction. These holes 325 correspond to the screws 52 of the fastening members 50, respectively. The holes 325 also correspond to the holes 447 (see FIGS. 7 and 8), respectively, which are formed in the housing 44. An internal diameter of each of the holes 325 is larger than the external diameter of the shank 523 of the screw 52 (see FIG. 2) but smaller than an external diameter of the head portion 521 of the screw 52 (see FIG. 2). Moreover, the internal diameter of the hole 325 is equal to or smaller than the internal diameter of the hole 447 of the housing 44.

As shown in FIG. 12, the receiving portions 3211 correspond to the holes 325, respectively. Each of the receiving portions 3211 is recessed rearward from the front surface 321 of the attaching portion 32. An internal diameter of the receiving portion 3211 is larger than the internal diameter of the hole 325. Moreover, the internal diameter of the receiving portion 3211 is slightly larger than the external diameter of the head portion 521 of the screw 52 of the fastening member 50 (see FIG. 2). The receiving portions 3211 receive the head portions 521 of the screws 52 of the fastening members 50 when the mating portion 30 is coupled to the body 20 (see FIG. 2).

As shown in FIGS. 11 and 13, the edge portion 36 extends along an edge of the rear surface 323 of the attaching portion 32 and protrudes rearward.

As understood from FIGS. 11 and 13, each of the first abutment portions 3231 is provided on the rear surface 323 of the attaching portion 32. In the present embodiment, the first abutment portions 3231 correspond to the holes 325, respectively. As described later, the first abutment portions 3231 abut on second abutment portions 4433 provided to the housing 44 (see FIG. 7). When viewed along the front-rear direction, each of the first abutment portions 3231 has a ring shape. The first abutment portion 3231 protrudes rearward from the rear surface 323. The first abutment portion 3231 surrounds the hole 325 corresponding thereto. However, the present invention is not limited thereto. The first abutment portions 3231 may not correspond to the holes 325. Moreover, the number of the first abutment portions 3231 should be at least three.

Referring again to FIG. 2, the main portion 40 is further provided with the latch portion 48. The latch portion 48 latches mating of the charging connector 10 to the mating connector (not shown) when the charging connector 10 is mated with the mating connector. However, in the present invention, the latch portion 48 is not essential. In a case where the latch portion 48 is absent, the third opening 3275 of the mating portion 30 is unnecessary.

As understood from FIGS. 1 and 2, when the housing 44 is held by the body 20, and the mating portion 30 is coupled to the body 20, the latch portion 48 protrudes forward from the main surface 4431 of the housing 44 and further protrudes forward from the attaching portion 32 of the mating portion 30 in the front-rear direction. In detail, the latch portion 48 passes over the housing 44 and through the third opening 3275 of the mating portion 30 to protrude forward.

Figure 4:
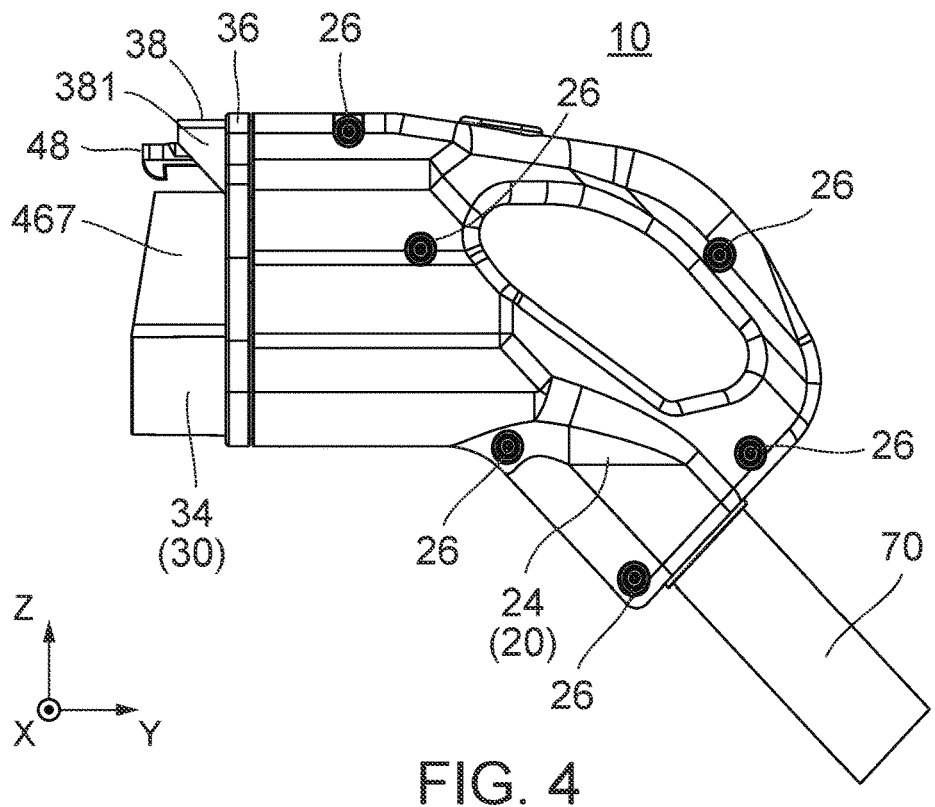
FIG. 4 is a side view showing the charging connector of FIG. 1.

As shown in FIGS. 1, 3 and 4, the upper protection portion 38 is located upward of the latch portion 48 in the up-down direction and protects the latch portion 48. With this structure, when the charging connector 10 accidentally falls, damage to the latch portion 48 can be prevented.

As shown in FIG. 1, when the housing 44 is held by the body 20, and the mating portion 30 is coupled to the body 20, the attaching portion 32 of the mating portion 30 is attached onto the main surface 4431 of the housing 44. The first surrounding portion 467 of the housing 44 extends forward through the first opening 3271 of the mating portion 30. The first surrounding portion 467 is located between the upper protection portion 38 and the second surrounding portion 34 in the up-down direction. Accordingly, when the charging connector 10 accidentally falls, damage to the first surrounding portion 467 can be prevented. In detail, the upper protection portion 38 mainly protects an upper side of the first surrounding portion 467, and the second surrounding portion 34 mainly protects a lower side of the first surrounding portion 467. Thus, the upper protection portion 38 protects not only the latch portion 48 but also the first surrounding portion 467. Therefore, even when the charging connector 10 does not have the latch portion 48, the upper protection portion 38 is necessary.

As understood from FIGS. 1 and 2, when the housing 44 is held by the body 20, and the mating portion 30 is coupled to the body 20, the second covering portion group 4613 is inserted into the second surrounding portion 34. Moreover, the base portion 465 is fit into the second surrounding portion 34. Since the base portion 465 is fit into the second surrounding portion 34, rotational movement of the mating portion with respect to the housing 44 can be prevented even when the shape of the first surrounding portion 467 and the shape of the first opening 3271 are circular shapes.

As shown in FIG. 3, the second surrounding portion 34 surrounds the second covering portion group 4613 in a plane perpendicular to the front-rear direction. In other words, the second surrounding portion 34 surrounds the second terminal group 423 in the plane perpendicular to the front-rear direction. Moreover, as understood from FIG. 4, the second covering portion group 4613 is located inward of the second surrounding portion 34 in the front-rear direction. Thus, the second surrounding portion 34 protects the second covering portion group 4613 and the second terminal group 423. As a result, when the charging connector 10 accidentally falls, damage to both the second covering portion group 4613 and the second terminal group 423 can be prevented by the second surrounding portion 34.

As understood from the description mentioned above, it is highly possible that damage caused by falling of the charging connector 10 occurs on the mating portion 30. This means that it is highly possible that repairing of the charging connector 10 damaged is finished by only replacing the mating portion 30. Here, the first surrounding portion 467 and the covering portions 461 are provided to the housing 44. Accordingly, replacing of the mating portion 30 does not change an arrangement of the first surrounding portion 467 and the covering portions 461. Therefore, arrangement accuracy of the first terminal group 421 and the second terminal group 423 which uses the first surrounding portion 467 as an arrangement reference can be maintained at a high level.

Hereinafter, further description will be made about holding of the housing 44 by the body 20 and coupling of the mating portion 30 to the body 20.

As understood from FIGS. 2, 5 and 6, when the housing 44 is held by the body the rear portion 445 of the partition wall 441 of the housing 44 is located rearward of the elongated protrusion portions 201 of the body 20 and located forward of the nut holding portions 204. In the front-rear direction, a position of the main surface 4431 of the partition wall 441 is identical with or located rearward of that of a front surface of the elongated protrusion portions 201 of the body 20.

As shown in FIGS. 6 and 8, the housing 44 has first contact portions 4453 oriented rearward. Moreover, as shown in FIG. 2, the body 20 has second contact portions 2041 oriented forward. When the housing 44 is held by the body 20, the first contact portions 4453 and the second contact portions 2041 face and are brought into contact with each other. With this structure, rearward movement of the housing 44 with respect to the body 20 is regulated. In other words, the first contact portions 4453 and the second contact portions 2041 position the housing 44 with respect to the body in the front-rear direction. In the present embodiment, the second contact portions 2041 are parts of front surfaces of the nut holding portions 204. Moreover, the first contact portions 4453 are sections which are parts of the rear surface 4451 of the partition wall 441 and face the second contact portions 2041 in the front-rear direction. However, the present invention is not limited thereto. The first contact portions 4453 may be protrusions which protrude rearward in the front-rear direction. In that case, the second contact portions 2041 may be parts of the front surfaces of the nut holding portions 204 or protrusions.

As understood from FIG. 2, before the housing 44 is held by the body 20, the nuts 54 are inserted or press-fit into the nut accommodation portions of the nut holding portions 204 of the body 20, respectively. When the housing 44 is held by the body 20, each of the side surfaces 4491 of the falling prevention portion 449 faces a side surface of any one of the nuts 54 but is apart from a side surface of the nut 54. With this structure, some of the nuts 54 can be prevented from falling away from the nut holding portions 204. In the present embodiment, two of the nuts 54 can be prevented from falling away from the nut holding portions 204.

As understood from FIGS. 1 and 2, the mating portion 30 is attached to the body 20 and the main portion 40 from the front of them. In the meantime, the elongated protrusion portions 201 of the body 20 are located inward of the edge portion 36 of the mating portion 30 in a plane perpendicular to the front-rear direction.

As shown in FIGS. 5 and 7, the second abutment portions 4433 are provided onto the main surface 4431 of the housing 44. The second abutment portions 4433 are sections which are parts of the main surface 4431 and correspond to the first contact portions 3231 of the mating portion 30, respectively.

As understood from FIGS. 2, 5 and 11, when the housing 44 is held by the body 20, and the mating portion 30 is coupled to the body 20 by the fastening members 50, each of the first abutment portions 3231 and the second abutment portion 4433 corresponding thereto abut on each other. As a result, positioning of the mating portion 30 with respect to the body 20 is made in the front-rear direction. Then, the main surface 4431 of the housing 44 faces the rear surface 323 of the mating portion 30 but is apart from the rear surface 323 in the front-rear direction. However, the present invention is not limited thereto. Parts of the front surfaces of the elongated protrusion portions 201 of the body 20 may be used as second abutment portions in place of the second abutment portions 4433. In that case, the first abutment portions 3231 may not surround the holes 325, respectively. For example, each of the first abutment portions 3231 may be a protrusion with a square shape. Alternatively, protrusions protruding forward may be provided on the front surfaces of the elongated protrusion portions 201 to use as the second abutment portions. At any rate, at least one portions of the first abutment portions 3231 and the second abutment portions 4433 should protrude in the front-rear direction. When at least one portions of the first abutment portions 3231 and the second abutment portions 4433 protrude in the front-rear direction, the rear surface 323 of the mating portion 30 and the main surface 4431 of the housing 44 face each other but are apart from each other in the front-rear direction. In other words, in the state that the mating portion 30 is coupled to the body the housing 44 is not in direct contact with the mating portion 30. With this structure, when the charging connector 10 falls, impact on the housing 44 can be suppressed.

As understood from FIG. 2, the fastening members 50 couple the mating portion 30 to the body 20. At this time, the head portions 521 of the screws 52 of the fastening members 50 are received by the receiving portions 3211 of the mating portion 30. Accordingly, the head portions 521 of the screws 52 are not in direct contact with the housing 44. Moreover, the internal diameter of the hole 447 of the housing 44 is larger than the external diameter of the shank 523 of the screw 52. Accordingly, the shank 523 of the screw 52 is not normally in direct contact with the housing 44. In other words, the housing 44 is normally located apart from the shank 523. Even in a case where the shank 523 is brought into contact with the housing 44, when viewed along the front-rear direction, the shank 523 is merely inscribed in an inner wall of the hole 447, and there is a space between the shank 523 and the inner wall of the hole 447. Furthermore, the nuts 54 are held by the body 20 but apart from the falling prevention portion 449. Accordingly, the nuts 54 are not in direct contact with the housing 44. Thus, the fastening members 50 couple the mating portion 30 to the body 20 without contact with the housing 44 at least in the front-rear direction. With this structure, when the charging connector 10 accidentally falls, transmission of impact received by the body 20 or the mating portion 30 to the housing 44 can be prevented or suppressed. As a result, damage of the main portion 40 which is caused by falling of the charging connector 10, or damage of the latch portion 48, the housing 44 and the contacts 42 thereupon is prevented or suppressed. However, the present invention is not limited thereto. The fastening members 50 may couple the mating portion 30 to the main portion 40. Nevertheless, it is preferable that the mating portion 30 is coupled to the body 20 so that damage to the main portion 40 is prevented or suppressed.

Although the specific explanation about the present invention is made above referring to the embodiments, the present invention is not limited thereto but susceptible of various modifications and alternative forms. For example, the housing 44 may have recess portions in place of the holes 447. Here, the recess portions are vacant areas of the partition wall 441 in a plane perpendicular to the front-rear direction. A size of each of the recess portions is set so that the housing 44 is apart from the shanks 523 of the screws 52 when the mating portion 30 is attached to the body 20 (see FIG. 2) by use of the fastening members 50 (see FIG. 2). With this structure, the fastening members 50 can couple the mating portion 30 to the body 20 by passing through the recess portions without contact with the housing 44.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A charging connector comprising a mating portion, a main portion, and a body, wherein:
the main portion comprises a plurality of contacts, which are respectively connectable to mating contacts of a mating connector, and a housing, which holds the contacts;
the contacts are divided into a first terminal group and a second terminal group;
the first terminal group is located upward of the second terminal group in an up-down direction;
the housing has a main surface, which is oriented forward in a front-rear direction perpendicular to the up-down direction, and a first surrounding portion, which protrudes forward from the main surface in the front-rear direction and surrounds the first terminal group in a plane perpendicular to the front-rear direction;
the body accommodates the main portion at least in part and holds the main portion;
the mating portion is located forward of the body in the front-rear direction;
the mating portion has an attaching portion, a second surrounding portion, and an upper protection portion;
the attaching portion is attached on the main surface of the housing;
the attaching portion extends in the plane perpendicular to the front-rear direction;
the attaching portion is provided with an opening which penetrates therethrough in the front-rear direction;
the first surrounding portion of the housing extends forward through the opening;
an entirety of the second surrounding portion is located downward of the opening in the up-down direction;
the second surrounding portion protrudes forward from the attaching portion in the front-rear direction and surrounds the second terminal group in the plane perpendicular to the front-rear direction; and
the upper protection portion is located upward of the opening in the up-down direction and protrudes forward from the attaching portion in the front-rear direction.

2. The charging connector as recited in claim 1, wherein:
the main portion is provided with a latch portion which latches mating of the charging connector to the mating connector;
the latch portion protrudes forward of the main surface of the housing in the front-rear direction; and
the upper protection portion is located upward of the latch portion at least in part in the up-down direction and protects the latch portion.

3. The charging connector as recited in claim 1, wherein:
the first surrounding portion has a circular shape in the plane perpendicular to the front-rear direction;
the housing is provided with a base portion;
the base portion has a particular shape other than a circular shape and protrudes forward from the main surface;
the second surrounding portion has a shape corresponding to the base portion; and
the base portion is fit in the second surrounding portion.

4. The charging connector as recited in claim 1, wherein:
the charging connector further comprises a fastening member;
the fastening member fastens the mating portion to the body; and
the fastening member is not in contact with the housing at least in the front-rear direction.

5. The charging connector as recited in claim 4, wherein:
the fastening member is provided with a screw and a nut;
the screw has a shaft portion and a head portion;
the mating portion has a receiving portion which receives the head portion;
the body has a holding portion which holds the nut; and
the housing is located apart from the shaft portion.

6. A mating portion of a charging connector, wherein:
the charging connector comprises a main portion;
the main portion has a main surface, which is oriented forward in a front-rear direction, and a first surrounding portion, which protrudes forward from the main surface;
the mating portion has an attaching portion, a second surrounding portion, and an upper protection portion;
the attaching portion is configured to be attached on the main surface of the main portion;
the attaching portion extends in a plane perpendicular to the front-rear direction;
the attaching portion is provided with an opening which penetrates therethrough in the front-rear direction;
when the attaching portion is attached on the main surface of the main portion, the first surrounding portion of the main portion extends forward through the opening;
an entirety of the second surrounding portion is located downward of the opening in an up-down direction perpendicular to the front-rear direction;
the second surrounding portion protrudes forward from the attaching portion in the front-rear direction; and
the upper protection portion is located upward of the opening in the up-down direction and protrudes forward from the attaching portion in the front-rear direction.

7. A mating portion of a charging connector, wherein:
the charging connector comprises a main portion and a body;
the main portion comprises a plurality of contacts, which are respectively connectable to mating contacts of a mating connector, and a housing, which holds the contacts;
the contacts are divided into a first terminal group and a second terminal group;
the first terminal group is located upward of the second terminal group in an up-down direction;
the housing has a main surface, which is oriented forward in a front-rear direction perpendicular to the up-down direction, and a first surrounding portion, which protrudes forward from the main surface in the front-rear direction and surrounds the first terminal group in a plane perpendicular to the front-rear direction;
the body accommodates the main portion at least in part and holds the main portion;
the mating portion is located forward of the body in the front-rear direction;
the mating portion has an attaching portion, a second surrounding portion, and an upper protection portion;
the attaching portion is configured to be attached on the main surface of the housing;
the attaching portion extends in the plane perpendicular to the front-rear direction;
the attaching portion is provided with an opening which penetrates therethrough in the front-rear direction;
when the attaching portion is attached on the main surface of the housing, the first surrounding portion of the housing extends forward through the opening;
an entirety of the second surrounding portion is located downward of the opening in the up-down direction;
the second surrounding portion protrudes forward from the attaching portion in the front-rear direction and surrounds the second terminal group in the plane perpendicular to the front-rear direction when the attaching portion is attached on the main surface of the housing; and
the upper protection portion is located upward of the opening in the up-down direction and protrudes forward from the attaching portion in the front-rear direction.

* * * * *